(12) United States Patent
Mallick et al.

(10) Patent No.: US 11,321,400 B2
(45) Date of Patent: May 3, 2022

(54) SYSTEM AND METHOD FOR CRAWLING WEB-CONTENT

(71) Applicant: Innoplexus AG, Eschborn (DE)

(72) Inventors: Shubhojit Mallick, New Delhi (IN); Sandeep Singh, Mysore (IN); Vatsal Agarwal, Rampur (IN)

(73) Assignee: Innoplexus AG, Eschborn (DE)

( * ) Notice: Subject to any disclaimer, the term of this patent is extended or adjusted under 35 U.S.C. 154(b) by 366 days.

(21) Appl. No.: 16/512,507

(22) Filed: Jul. 16, 2019

(65) Prior Publication Data

US 2021/0019354 A1 Jan. 21, 2021

(51) Int. Cl.
*G06F 7/00* (2006.01)
*G06F 16/951* (2019.01)
*G06N 5/04* (2006.01)
*G06N 20/00* (2019.01)

(52) U.S. Cl.
CPC ............ *G06F 16/951* (2019.01); *G06N 5/04* (2013.01); *G06N 20/00* (2019.01)

(58) Field of Classification Search
CPC ......... G06F 16/951; G06N 20/00; G06N 5/04
USPC ................................................ 707/600–899
See application file for complete search history.

(56) References Cited

U.S. PATENT DOCUMENTS

2018/0307480 A1* 10/2018 Doyle .................... G06F 8/658

* cited by examiner

*Primary Examiner* — Isaac M Woo
(74) *Attorney, Agent, or Firm* — Ziegler IP Law Group, LLC (57) ABSTRACT

Disclosed is a system comprising: a data repository storing web-content; a data processing arrangement communicatively coupled to data repository, wherein data processing arrangement is configured to: acquire a web-page signature file associated to web-content, from a web-server hosting a website for displaying web-content, wherein web-page signature file includes a plurality of data related to web-content; analyse plurality of data included in web-page signature file to identify a modification in website; compare web-content stored in data repository with web-content displayed on website to determine additional web-content included in web-content displayed on website; use a machine learning algorithm to determine an importance value for additional web-content using a set of predefined parameters; crawl web-content stored in data repository based on additional web-content upon determining importance value to be greater than a predefined threshold value; and predict a time for crawling web-content using forecast module.

15 Claims, 2 Drawing Sheets

SYSTEM AND METHOD FOR CRAWLING WEB-CONTENT

TECHNICAL FIELD

The present disclosure relates generally to information systems; and more specifically, to systems for crawling web-content stored in data repository. The present disclosure also relates to methods for crawling web-content stored in data repository.

BACKGROUND

Over the years, with development in technology, a large amount of information is stored on the World Wide Web. Currently, the information stored on the World Wide Web is continuously changed by updating the html documents. Furthermore, with the change of information on the World Wide Web, there is a need for updating of information saved at remote locations and databases.

Conventionally, with detection of change of information on the World Wide Web, the html document comprising the update is downloaded by the individual and the organization. The new html document is compared with the existing html document present in the remote location and database. The existing html document is replaced with the new html document based on the comparison.

However, the conventional technique includes certain limitations associated therewith. Firstly, the conventional technique relies considerably on manual intervention and is thereby time consuming. For example, a data scientist has to manually examine each and every update by comparing the existing html document with the new html document. Secondly, the conventionally technique is tedious, inefficient. For example, a data scientist has to manually check for the updated HTML pages to identify any changes therein, and thereafter download the identified HTML page and subsequently manually compare to determine the change therein and determine an importance and then update the existing html document. Furthermore, as the conventional technique is largely dependent on human intervention, therefore, the conventional technique is prone inaccuracies. Moreover, the conventional technique is not economical as owing to continual upgradation of information a large database is required for storing the downloaded new html document.

Therefore, in light of the foregoing discussion, there exists a need to overcome the aforementioned drawbacks associated with updating the saved information, shared over the World Wide Web, at remote locations and databases.

SUMMARY

The present disclosure seeks to provide a system for crawling web-content. The present disclosure also seeks to provide a method for crawling web-content. The present disclosure also seeks to provide a computer readable medium, containing program instructions for execution on a computer system, which when executed by a computer, cause the computer to perform method steps for crawling web-content.

The present disclosure seeks to provide a solution to the existing problem of crawling web-content, and updating and maintaining a data repository storing the web-content. An aim of the present disclosure is to provide a solution that overcomes at least partially the problems encountered in prior art, and eliminates a need for manually updating the data repository every time there is an addition or change in the web-page hosting the web-content.

In one aspect, an embodiment of the present disclosure provides a system comprising:
   a data repository storing web-content;
   a data processing arrangement communicatively coupled to the data repository, wherein the data processing arrangement is configured to:
      acquire a web-page signature file associated to the web-content, from a web-server hosting a website for displaying the web-content, wherein the web-page signature file includes a plurality of data related to the web-content;
      analyse the plurality of data included in the web-page signature file to identify a modification in the website;
      compare the web-content stored in the data repository with the web-content displayed on the website to determine additional web-content included in the web-content displayed on the website;
      use a machine learning algorithm to determine an importance value for the additional web-content using a set of predefined parameters; and
      crawl the web-content stored in the data repository based on the additional web-content upon determining the importance value to be greater than a predefined threshold value.

In another aspect, an embodiment of the present disclosure provides a method, wherein the method is implemented via a system comprising:
   a data repository storing web-content;
   a data processing arrangement communicatively coupled to the data repository, wherein the method comprises:
      acquiring a web-page signature file associated to the web-content, from a web-server hosting a website for displaying the web-content, wherein the web-page signature file includes a plurality of data related to the web-content;
      analysing the plurality of data included in the web-page signature file to identify a modification in the website;
      comparing the web-content stored in the data repository with the web-content displayed on the website to determine additional web-content included in the web-content displayed on the website;
      using a machine learning algorithm to determine an importance value for the additional web-content using a set of predefined parameters; and
      crawling the web-content stored in the data repository based on the additional web-content upon determining the importance value to be greater than a predefined threshold value.

In yet another aspect, an embodiment of the present disclosure provides a computer readable medium, containing program instructions for execution on a computer system, which when executed by a computer, cause the computer to perform method steps, wherein the method is implemented via a system comprising:
   a data repository storing web-content;
   a data processing arrangement communicatively coupled to the data repository, wherein the method comprises:
      acquiring a web-page signature file associated to the web-content, from a web-server hosting a website for displaying the web-content, wherein the web-page signature file includes a plurality of data related to the web-content;

analysing the plurality of data included in the web-page signature file to identify a modification in the website;

comparing the web-content stored in the data repository with the web-content displayed on the website to determine additional web-content included in the web-content displayed on the website;

using a machine learning algorithm to determine an importance value for the additional web-content using a set of predefined parameters; and crawling the web-content stored in the data repository based on the additional web-content upon determining the importance value to be greater than a predefined threshold value.

Embodiments of the present disclosure substantially eliminate or at least partially address the aforementioned problems in the prior art, and enables updating the data repository with the web-content based on the set of predefined parameters.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system comprising:

a data repository storing web-content;

a data processing arrangement communicatively coupled to the data repository, wherein the data processing arrangement is configured to:

acquire a web-page signature file associated to the web-content, from a web-server hosting a website for displaying the web-content, wherein the web-page signature file includes a plurality of data related to the web-content;

analyse the plurality of data included in the web-page signature file to identify a modification in the website;

compare the web-content stored in the data repository with the web-content displayed on the website to determine additional web-content included in the web-content displayed on the website;

use a machine learning algorithm to determine an importance value for the additional web-content using a set of predefined parameters; and crawl the web-content stored in the data repository based on the additional web-content upon determining the importance value to be greater than a predefined threshold value.

In another aspect, an embodiment of the present disclosure provides a method, wherein the method is implemented via a system comprising:

a data repository storing web-content;

a data processing arrangement communicatively coupled to the data repository, wherein the method comprises:

acquiring a web-page signature file associated to the web-content, from a web-server hosting a website for displaying the web-content, wherein the web-page signature file includes a plurality of data related to the web-content;

analysing the plurality of data included in the web-page signature file to identify a modification in the website;

comparing the web-content stored in the data repository with the web-content displayed on the website to determine additional web-content included in the web-content displayed on the website;

using a machine learning algorithm to determine an importance value for the additional web-content using a set of predefined parameters; and crawling the web-content stored in the data repository based on the additional web-content upon determining the importance value to be greater than a predefined threshold value.

The present disclosure provides the aforementioned system and the aforementioned method for determining the significance of update in the web-content. The system stores the web-content in data repository. Beneficially, the system described herein eliminates the need for updating the data repository web-content every time there is addition in the web-content. Therefore, the system is cost-effective and economical. Furthermore, the system reduces human intervention by employing a machine learning algorithm. The machine learning algorithm determines the web-content to be updated in the data repository based on the set of predefined parameters. The system thereby is accurate in determining the web-content to be updated in the data repository. Moreover, the system is efficient and thereby saves a lot of computation time. The system allows in conveniently storing and maintaining the web-content in the data repository. Additionally, updating of the data repository refers to at least one of: adding the web-content to the data repository, removing the web-content from the data repository, and modifying the existing web-content in the data repository. The data repository is accessed and used by individuals and organizations on a regular basis for research, development, experimentation, documentation, and the like. Therefore, the data repository has to be updated whenever there is change in the web-content, so that the individuals and organizations have access to the updated data repository. In an example, a data repository accessed by doctors to know about medicines for curing diseases has to be kept updated so that doctors have access to information regarding latest medicines for curing new diseases.

The system refers to a collection of one or more programmable and non-programmable components that are interconnected and operable to aggregate the web-content, determine changes in the web-content, determine significance of the web-content and further update the data repository with the web-content. Furthermore, the interconnected components are configured to alter, create or append records or files related to the web-content stored in the data repository (described in greater detail later). For example, a data repository may include data, records or files associated to web-contents related to research in life science. In such instance the system may be configured to the update a data repository by altering, creating or appending the data, records or files related to the web-content stored in the data repository.

The system comprises the data repository. Throughout the present disclosure, the term "data repository" relates to any device or combination of devices capable of storing, accessing and retrieving data (namely web-content), which may include any combination and number of data servers, databases, data storage devices and data storage media, in any standard, distributed or clustered environment. Optionally, the data repository can be any data storage software or a database management system that can organize data in the form of a table, a map, a grid, a packet, a datagram, a file, a document, a list or in any other form. Additionally, the data repository is populated by data elements. Furthermore, the data elements may include data records, bits of data, web-content and the like.

Throughout the present disclosure, the term "web-content" relates to a type or arrangement of information accessible over the web, or over other portions of the Internet. Furthermore, the type or arrangement of information broadly refers to one or more documents, files, scripts, codes, executable programs, web pages or any other digital data that can be transmitted via a network (such as the Internet). Optionally, the web content relates to data associated with a webpage accessed by the programmable and/or non-programmable components of the system whilst browsing the web. Example of data can include textual, visual, and/or aural content exhibited on a web-page. It will be appreciated that a web-page refers to a document generally written in Hypertext Mark-up Language (html) which makes the web-content accessible via web-browsers such as Firefox, Opera, Safari and the like. Optionally, the web-content can be data related to a specific subject area such as (diseases, environment, electronic devices, quantum physics).

Optionally, the data repository storing the web-content is further configured to store Uniform Resource Identifiers associated with the web content. Optionally, the Uniform Resource Identifiers may be stored in the data repository in a crawl frontier. In an example, the crawl frontier can be specific list of Uniform Resource Identifiers (URIs) that can be used to access the web-pages that used to host the web-content stored in the data repository.

The system comprises the data processing arrangement communicatively coupled to the data repository. Throughout the present disclosure, the term "data processing arrangement" relates to programmable and/or non-programmable components configured to execute one or more software application for storing, processing and/or share data and/or set of instruction. Optionally, the data processing arrangement can include, for example, a component included within an electronic communications network. Additionally, the data processing arrangement includes one or more data processing facilities for storing, processing and/or sharing data and/or set of instruction. Furthermore, the data processing arrangement includes hardware, software, firmware or a combination of these, suitable for storing and processing various information and services accessed by the one or more user using the one or more user equipment. Optionally, the data processing arrangement includes functional components, for example, a processor, a memory, a network adapter and so forth.

Furthermore, the data processing arrangement is communicatively coupled to the data repository using the wired communication network; the wireless communication network that can be implemented as a Local Area Network (LAN), a Wireless Local Area Network (WLAN), Wi-Fi®, Internet, Bluetooth® and so forth; or a combination of the wired communication network and the wireless communication network. In such an instance, the data processing arrangement is operable to receive the web-content from the data repository. More optionally, the system comprises a memory unit communicatively coupled to the data processing arrangement, wherein the memory unit is operable to store the web-content therein. For example, the memory unit can be implemented as a non-volatile memory unit (such as a Secure Digital card, a hard disk drive and so forth) incorporated within a device (such as, a laptop computer, a tablet computer, a smartphone, a personal digital assistant (PDA) and so forth) comprising the data processing arrangement therein. In such an instance, the data processing arrangement is operable to receive the web-content from the memory unit.

The data processing arrangement is configured to acquire the web-page signature file associated to the web-content. Throughout the present disclosure, the term "web-page signature file" relates to a file associated with the web-page, wherein the web-page signature file provides information related to changes made in the existing web-page. The web-page signature file changes with every modification made in the web-page. In an example, a first web-page signature file is changed to a second web-page signature file when there is change in content displayed in the existing web-page, such as an addition of text in the web-page. In another example, a first web-page signature file is changed to a second web-page signature file when a picture is added to the web-page. Optionally, the web-page signature file can include be a combination of various characters, examples of characters may include alphabets, numbers and the like. Optionally, any change in the content displayed in the existing webpage (such as addition of text) will result in the change the combination of various characters of the web-page signature file, such as the combination of alphabets and numbers. In an example, 21ABXY3 is included in a web-page signature file associated with a web-page, 21 in the web-page signature file represents a date of last addition, ABXY in the web-page signature file represents a source of web-page, 3 in the web-page signature file represents the number of times text is added on the web-page.

Optionally, the web-page signature file can be in different file formats. For example, web-page signature file can be a Microsoft Excel® spreadsheet, a Microsoft Word® document, a Microsoft PowerPoint® slideshow, a publisher file, an image file (such as a .jpg image file, a .jpeg image file, a .png image file, a .bmp image file, a .gif image file and so forth) and so forth.

The web-page signature file includes the plurality of data related to the web-content. Optionally, the plurality of data related to the web-content refers to any data from that describes the various features of the web-content. Furthermore, the plurality of data included in the web-page signature file describes any change in the various features associated with the web-content. Moreover, the plurality of data related to the web-content can signifies the changes made in the web-page having the web-content. Optionally, the plurality of data related to the web-content comprises a time stamp, a source of the web-content, count of additions made in the web-content, and a word count of the web-content. The time stamp refers to a time and a date related to the additions made in the web-content. Furthermore, the time stamp related to the web-content includes at least one of: a date and a time on which the web-content was created, a date and a time on which the web-content was last added, a duration of time taken to add the web-content, and a date and a time on which the web-content was last accessed. In an example, a time stamp related to a web-content includes a date 15 Aug. 2016 and a time 10 a.m. on which the web-content was created, a date 20 Sep. 2018 and a time 11 a.m. on which the web-content was last added, a duration of 80 seconds taken to add the web-content, and a date 21 Sep. 2018 and a time 10 a.m. on which the web-content was last accessed. The source of the web-content refers to at least one of: an author who created an original web-content and/or created the addition in the web-content, and/or a developer who has added the web-content on the web-page, and/or a database from where the additional web-content is obtained. The count of additions made in the web-content refers to the number of times the web-content is added to the original web-content on the web-page. In an example, a web-content is added to the original web-content 10 times in a day. Furthermore, time-stamp related to the web-content is changed 10 times. The word count of the web-content includes at least one of: word count, character count, line count and paragraph count. In an example, the word count of the web content is 500 words, 2000 characters, 15 lines and 3 paragraphs.

In an example, a web-page signature file is a Microsoft Excel® spreadsheet in which the spreadsheet has a column each for time stamp of the web-content, source of the web-content, count of additions made in the web-content, and word count of the web-content. In another example, a web-page signature file is a Microsoft Word® document in which the document has a page each for time stamp of the web-content, source of the web-content, count of additions made in the web-content, and word count of the web-content.

The data processing arrangement is configured to acquire the web-page signature file from the web-server hosting the website for displaying the web-content. Throughout the present disclosure, the term "web-server" relates to a structure and/or module that includes programmable and/or non-programmable components configured to store, process and display web-pages containing the web-content on World Wide Web via the website. Optionally, the web-server includes any arrangement of physical or virtual computational entities capable of enhancing information to perform various computational tasks. Furthermore, it should be appreciated that the web-server may be both single hardware web-server and/or plurality of hardware web-servers operating in a parallel or distributed architecture. In an example, the web-server may include components such as memory, a processor, a network adapter and the like, to store, process and/or share information with other computing components, such as user device/user equipment. Optionally, the web-server can be implemented as a computer program that provides various services (such as database service) to other devices, modules or apparatus. The term "website" refers to a group of web-pages which are related to each other and wherein the group of web-pages have similar kind of web-content. In an example, a website related to diseases includes web-pages related to lung diseases, heart diseases, brain diseases and the like.

Optionally, the data processing arrangement acquires the web-page signature file from the web-server via wired communication network and/or wireless communication network that can be implemented as a Local Area Network (LAN), a Wireless Local Area Network (WLAN), Wi-Fi®, Internet, Bluetooth® and so forth; or a combination of the wired communication network and the wireless communication network. Optionally, the data processing arrangement can include a set of routine or programme code that is configured to communicate with the web-server and request the web-page signature file from therein. Furthermore, the set of routine or programme code can be configured to request for the web-page signature file from the web-server regularly after a predefined period-time period. For example, the set of routine or programme code can be configured to request for the web-page signature file from the web-server after every 15 days.

The data processing arrangement is configured to analyse the plurality of data included in the web-page signature file to identify the modification in the website. The plurality of data included in the web-page is analysed to detect a change in the plurality of data. The change in plurality of data refers to a change in at least one of: the time stamp related to web-content, the source of the web-content, count of additions made in the web-content, and/or a word count of the web-content. The change in the plurality of data represents the modification in the website displaying the web-content.

Optionally, the change in plurality of data is detected by the data processing arrangement by comparing a new plurality of data with an old plurality of data. The new plurality of data refers to the plurality of data after the modification is made on the website. The old plurality of data refers to the plurality of data before the modification is made on the website. Optionally, the data processing arrangement is operable to store the old plurality of the data included in the web-page signature file. More optionally, the old plurality of data included in the web-page signature file stored in the data processing arrangement is replaced with the new plurality of data after the comparison between the old plurality of data and the new plurality of data.

Optionally, the web-page signature file associated to the web-content is synchronized with web-server and thereby the plurality of data associated with the web-content is continuously and synchronically changed with the modification in the website. Therefore, the data processing arrangement acquires the web-page signature file once and further the same web-page signature file is used for identifying the modification in the website every time there is any modification in the website. In an example, a Microsoft Excel® spreadsheet is synchronized with the web-server. The plurality of data in the columns of the spreadsheet is continuously and synchronically changed with the modification in the website.

Throughout the present disclosure, the term "modification in the website" relates to changes made in the web-content such as: addition in text of the web-content, removal of text from the web-content, addition of an image in the web-content, and removal of image from the web-content. In an example, a time stamp related to a web-content including a date 15 Aug. 2016 and a time 10 a.m. on which the web-content was created; a date 20 Sep. 2018 and a time 11 a.m. on which the web-content was last added and a duration of 80 seconds taken to add the web-content, is changed to a time stamp including the date 15 Aug. 2016 and a time 10 a.m. on which the web-content was created, a date 30 Sep. 2018 and a time 9 a.m. on which the web-content was last added, and a duration of 70 seconds taken to add the web-content. In such an example, the data processing arrangement analyses the time stamp to detect change in the date and time on which the web-content was last added, and the change in the duration of time taken to add the web-content. Thus, tracking the change in the date and time on which the web-content was last added, and the change in the duration of time taken to add the web-content, allows in identifying the modification in the website.

In another example, a count of number of times additions made in the web-content is changed to 11 from existing 10. In such an example, the data processing arrangement analyses the change in the count of additions made in the web-content to identify the modification in the website. In yet another example, word count of a web-content having word count of 500 words, character count of 2000 characters, line count of 15 lines and paragraph count of 3 paragraphs is changed to word count of 550 words, character count of 2200 characters, line count of 18 lines and paragraph count of 4 paragraphs. In such an example, the data processing arrangement analyses the change in the word count of web-content to identify the modification in the website.

Optionally, the data processing arrangement obtains the web-content in data repository via wired communication network, the wireless communication network and/or a combination of the wired communication network and the wireless communication network.

The data processing arrangement is configured to compare the web-content stored in the data repository with the web-content displayed on the website to determine additional web-content included in the web-content displayed on the website. Throughout the present disclosure, the term "additional web-content" relates to the web-content which is added to the web-content displayed on the website, and/or removed from the web-content displayed on the website and/or the web-content displayed on the website which is altered. In an example, a text included in a web-content stored in a data repository is "a drug can be used for humans" and the text included in the web-content displayed on a website is "a drug can be used for humans and animals". In such an example, the text "and animals" is an additional text added to the existing web-content thus, forming the additional web-content. In another example, a text included in a web-content stored in a data repository is "brass is an alloy made of iron, zinc, copper" and the text included in the web-content displayed on a website is "brass is an alloy made of zinc and copper". In such an example, the text "iron" is an additional web-content. In yet another example, the text included in a web-content stored in a data repository is "plant perform photosynthesis" and the text included in the web-content displayed on a website is "plants perform photosynthesis". In such an example, the text "plant" is the additional web-content which is altered.

In another example, images included in a web-content stored in a data repository include image1, image2 and image3, and the images included in the web-content displayed on a website include image1, image2, image3 and image4. In such an example, the image4 is the additional web-content which is added to the web-content displayed on the website. In yet another example, images included in a web-content stored in a data repository include image5, image6 and image7, and the images included in the web-content displayed on a website include image5, and image6. In such an example, the image7 is the additional web-content which is removed from the web-content displayed on the website.

Optionally, the data processing arrangement performs the comparison of the web-content stored in the data repository with the web-content displayed on the website by at least one of: comparing each word in the web-content stored in the data repository with each word in the web-content displayed on the website; comparing each line in the web-content stored in the data repository with each line in the web-content displayed on the website and/or comparing the whole web-content stored in the data repository with the whole web-content displayed on the website. Furthermore, based on the comparison the additional web-content included in the web-content displayed on the website is determined.

The data processing arrangement is configured to use the machine learning algorithm to determine the importance value for the additional web-content using the set of pre-defined parameters. Throughout the present disclosure, the term "machine learning algorithm" described herein relates to software-based algorithms that are executable upon computing hardware, such as the data processing arrangement, and are operable to adapt and adjust their operating parameters in an adaptive manner depending upon information that is presented to the software-based algorithms when executed upon the computing hardware. Optionally, the machine learning algorithms include neural networks such as recurrent neural networks, recursive neural networks, feed-forward neural networks, convolutional neural networks, deep belief networks, and convolutional deep belief networks; self-organizing maps; deep Boltzmann machines; and stacked de-noising auto-encoders. Optionally, the machine learning algorithms employ any one or combination of the following computational techniques: constraint program, fuzzy logic, classification, symbolic manipulation, fuzzy set theory, evolutionary computation, cybernetics, data mining, approximate reasoning, derivative-free optimization, decision trees, or soft computing. Furthermore, throughout the present disclosure, the term "importance value" described herein relates to a numeric value, an alphabetic value, and/or an alphanumeric value assigned to the additional web-content displayed on the website. Optionally, a higher importance value related to the additional web-content describes a higher significance of the additional web-content to the context of the web-content displayed on the website. In an example, importance value of an additional web-content is 2530. In another example, importance value of an additional web-content is ADVF. In yet another example, importance value of an additional web-content is 2A8FD. Optionally, the alphabetic value and the alphanumeric value assigned to the additional web-content are converted to numeric value. Optionally, the alphabets in alphabetic value and the alphanumeric value are converted to corresponding ASCII value. In an example, alphabetic value of ABCD is converted to 65666768. In another example, alphanumeric value A25D is converted to 652568.

Throughout the present disclosure, the term "set of predefined parameters" described herein relates to a group of parameters which are implemented on the additional web content by the machine learning algorithm to determine the importance value. Optionally, the set of predefined parameters are stored in the data processing arrangement.

Optionally, the set of predefined parameters comprises at least one of: a type of addition in the web-content, position of the addition in the web-content, a quality of addition in the web content, and a quantity of addition in the web content. The set of predefined parameters comprises a parameter for determining the importance value for an overall modification in the web-content displayed on the website, a parameter for determining the importance value for modification in the text of the web-content displayed on the website, a parameter for determining the importance value for modification in uniform resource locator (URL) included in the text of the web-content displayed on the website, a parameter for determining the importance value based on the type of modification in the web-content (such as change in text, change in URL of text) displayed on the website, a parameter for determining the importance value based on the quality of modification in the web-content displayed on the website, a parameter for determining the importance value based on quantity of modification in the web-content displayed on the website, and a parameter for determining the importance value based on location of the modification in the web-content displayed on the website.

Furthermore, the quality of modification in the web-content displayed on the website refers to an impact the additional web-content has on the web-content displayed on the website. The impact of the additional web-content refers to the influence the additional web-content has on the meaning of the web-content. Furthermore, the impact of the additional web-content refers to the significance of the additional web-content in the context of the web-content. In an example, a text included in a web-content stored in a data repository is 'Deforestation affects climatic change' and the text included in the web-content displayed on a website is 'Deforestation affects: climatic change'. In such example, symbol (colon) ':' is the additional web-content which is not causing a change in the meaning of the web-content displayed on the website. Therefore, in such example, the additional web-content has no impact on the web-content displayed on the website and has a low quality of modification. Furthermore, the importance value assigned to the additional web-content is low.

In another example, a text included in a web-content stored in a data repository is 'The Chief Executive Officer of the company is 'xyz' and the text included in the web-content displayed on a website is 'The Chief Executive Officer of the company is 'abc'. In such an example, the text 'abc' is the additional web-content which has replaced the text 'xyz'. A change in the name of the Chief Executive Officer of the company is significant to the web-content. Therefore, in such example, the additional web-content has impact on the web-content displayed on the website and has a high quality of modification. Furthermore, the importance value assigned to the additional web-content is high.

Moreover, the quantity of modification in the web-content displayed on the website refers to the change in the number of at least one of: word count, character count, line count and/or paragraph count. In an example, web-content stored in a data repository has a word count of 600 words, character count of 3000 characters, line count of 25 lines and paragraph count of 6 paragraphs. The web-content displayed on a website has a word count of 650 words, character count of 3500 characters, line count of 28 lines and paragraph count of 7 paragraphs. The modification on web-content displayed in website having 50 additional words, 500 additional characters, 3 additional lines and 1 additional paragraph, thereby depicts the quantity of the modification in the web-content displayed on the website.

Optionally, the higher is the quantity of modification in the web-content higher is the importance value related to the additional web-content. In an example, a first modification on web-content displayed in website having 80 additional words, 520 additional characters, 4 additional lines and 1 additional paragraph has higher importance value compared to a second modification on web-content displayed in website having 40 additional words, 350 additional characters, 2 additional lines and 1 additional paragraph.

Furthermore, the location of modification in the web-content displayed on the website refers to the position of the additional web-content in the web-content displayed on the website. The additional web-content can be added to at least one of header, footer, main-body of the web-content. Optionally, the web-content related to different subject matter can have different levels of significance of the additional web-content based on the position of the additional web-content in the web-content displayed in the website. In an example, the web-content related to a particular subject matter can have additional web-content at footer be more significant compared to the additional web-content in the main-body.

Optionally, the importance value related to the additional web-content is based on the position of the additional web-content. In an example, a first modification on web-content displaying additional web-content at header of the web-content has higher importance value compared to a second modification on web-content displaying additional web-content at the footer of the web-content.

Optionally, the importance value is validated using a feedback received from a user. Throughout the present disclosure, the term "feedback" relates to user determined importance value for the additional web-content in the web-content displayed on the website which determined by the user. It is to be understood that, the user acquires the web-page signature file associated to the web-content, from the web-server hosting the website for displaying the web-content. Furthermore, the user analyses the plurality of data included in the web-page signature file to identify the modification in the website. Moreover, based on the modification in the website, the user compares the web-content stored in the data repository with the web-content displayed on the website to determine additional web-content included in the web-content displayed on the website. Furthermore, based on the comparison and the understanding of the user, the feedback comprising the user determined importance value for the additional web-content is provided to the data processing arrangement. It will be appreciated that the feedback from the user for validating the importance score is required only during a training phase of the machine learning algorithm. Moreover, upon the training of the machine learning algorithm, the machine learning algorithm is operable to determine the importance value without the feedback from the user.

Optionally, the feedback from the user comprising the user determined importance value for the additional web-content is in form of numeric value, alphabetic value, and/or alphanumeric value.

Optionally, the user provides the feedback to the machine learning algorithm of the data processing arrangement via wired communication network; wireless communication network implemented as a Local Area Network (LAN), a Wireless Local Area Network (WLAN), Wi-Fi®, Internet, Bluetooth® and so forth; or a combination of the wired communication network and the wireless communication network.

Optionally, the importance value for the additional web-content is a cumulative value based on the importance value based on each of the set of predefined parameters. In an example, importance value based on each of the set of predefined parameters is 100, 120, 220, 150, 80, and 300. The importance value for the additional web-content is cumulative value of 970.

Optionally, the validation of the importance value determined by the machine learning algorithm refers to comparing the importance value with the feedback received from the user. Optionally, for comparing the importance value with the feedback, both the importance value and the feedback are to be in similar forms. The feedback is converted to a form similar to that of the importance value. In an example, the importance value has a numeric value and the feedback has an alphanumeric value. Therefore, the feedback is converted to the numeric value.

Optionally, the machine learning algorithm further uses historical recorded data as input parameter for determining the importance value for the additional web-content. The term "historical recorded data" as used herein, refers to a periodically stored data associated with the additional web content displayed on the website. Specifically, the historical recorded data is a collection of information generated from periodically saving data related to the feedback provided by the user with the importance value determined for a given additional web-content. Optionally, the historical recorded data is stored at the data processing arrangement. In an example, a web-content may be data displayed on the website of hospital. In such instance, the data may be describing the names of doctors treating various diseases, images of the hospital cafeteria, and the like. Furthermore, in such instance, an additional web content may be a change in name of a doctor displayed on the website of hospital. In another such instance, an additional web content may be a change in name of another doctor displayed on the website of hospital. In yet another instance, an additional web content may be an image of the hospital cafeteria displayed on the website of hospital. In such instance, the importance value assigned to the additional web content describing the change in name of the doctors on the website of hospital, may be higher than the additional web content describing the image of the hospital cafeteria. In such instance, the historical recorded data may periodically store the additional web content describing the change in name of the doctors and image of the hospital cafeteria, chronologically according to the related importance value.

Optionally, the machine learning algorithm processes the historical recorded data to identify a trend in the historical recorded data. The term "trend" as used herein, refers to any commonality between the feedbacks provided by the user. The machine learning algorithm identifies the trend in the historical recorded data when there is a repetition in the feedbacks provided by the user for a defined multiple number of times.

Optionally, the trend is based on at least one of: the importance value of the additional web-content; and the feedback provided by the user for validating the importance value of the additional web-content. For example, in a first case, a machine learning algorithm signifies a change in a name of a Chief Technical Officer (CTO) in a web-content as less important and thereby assigns a low importance value to the additional web-content. However, the feedback from a user is greater compared to the importance value determined by the machine learning algorithm. In a second case, the machine learning algorithm signifies a change in a name of a Chief Executive Officer (CEO) in the web-content as less important and thereby assigns a low importance value to the additional web-content. However, the feedback from the user is greater compared to the importance value determined by the machine learning algorithm. In a third case, the machine learning algorithm signifies a change in a name of a Chief Operating Officer (COO) in the web-content as less important and thereby assigns a low importance value to the additional web-content. However, the feedback from the user is greater compared to the importance value determined by the machine learning algorithm. In a fourth case, the machine learning algorithm signifies a change in a name of a Chief Financial Officer (CFO) in the web-content as less important and thereby assigns a low importance value to the additional web-content. However, the feedback from the user is greater compared to the importance value determined by the machine learning algorithm. Furthermore, based on the first, second, third and fourth cases a trend is identified based on which the machine learning algorithm identifies the change in names of Chief Officers as significant and thereby assigns a higher importance value in subsequent additional web-content having change in the names of the Chief Officers.

Optionally, the machine learning algorithm can involve a decision tree or network defining decision states concerning whether or not to recognize one or more the trends associated with the historical recorded data. Furthermore, weightings associated with the decision states are based on previous experiences of recognizing one or more the trends associated with the historical recorded data; optionally, the experiences are aggregated across a plurality of trends, as will be described in greater detail below.

The machine learning algorithm is operable to migrate between the decision states depending upon content presented to the machine learning algorithm, in operation. Moreover, the machine learning algorithm is operable to generate new decision states for new types of web-content that have not previously been provided to the machine learning algorithm, as detected using a matching function of the machine learning algorithm that compares a given type of content with another type of web-content. The matching function is optionally based upon a neural network that is trained against different types of content to differentiate therebetween. For performing such a comparison of content, the content is processed to generate metadata, or pseudo-metadata, wherein the matching function is operable to determine a "distance" between the contents being compared, based at least in part upon the metadata or pseudo-metadata. For example, pseudo-metadata may be a combination of importance value and user feedback associated with the additional web content being compared; the metadata may define the additional content that relates to a category.

Optionally, the set of predefined parameters used to determine the importance value for the additional web-content are amended by the data processing arrangement, based on the feedback provided by the user. The set of predefined parameters are amended to allow the machine learning algorithm to determine the importance value which is close to the feedback provided by the user. In an example, the set of predefined parameters provide a higher importance value to the additional web-content in footer of the website compared to the additional web-content in the main-body of the website. In such an example, upon determination of additional web-content in the footer, the machine learning algorithm provides higher importance value. However, the user provides a feedback which is lower compared to the importance value. Therefore, the data processing arrangement amends the set of predefined parameters such that the set of predefined parameters provide a lower importance value to the additional web-content in footer of the website compared to the additional web-content in the main-body of the website.

Optionally, based on the validation of the importance value using the feedback received from the user, if the importance value is different from the feedback, the importance value is replaced with the feedback. In an example, the importance value determined by the machine learning algorithm is 2445 while the feedback provided by the user is 1508. The importance value is compared with the feedback and thereby the importance value is changed to 1508.

The data processing arrangement is configured to crawl the web-content stored in the data repository based on the additional web-content upon determining the importance value to be greater than the predefined threshold value. Throughout the present disclosure, the term "predefined threshold value" relates to an importance value set by the user and/or the data processing arrangement for classifying the significance of the additional web-content in the web-content displayed on the website. In a case, an importance value of the additional web-content is less than the predefined threshold value, the additional web-content is not considered significant in the context of the web-content displayed on the website and thereby the web-content stored in the data repository is not crawled with the additional web-content. In another case, if the importance value of the additional web-content is more than the predefined threshold value, the additional web-content is considered significant in the context of the web-content displayed on the website and thereby the web-content stored in the data repository is crawled with the additional web-content.

Optionally, the predefined threshold value is in form of numeric value, an alphabetic value, or an alphanumeric value. The importance value is converted to a form similar to that of the predefined threshold value. In an example, a predefined threshold value has a numeric value and the importance value has an alphanumeric value. Therefore, the importance value is converted to numeric value.

It will be appreciated that the data repository comprises a list of uniform resource locator (URL) related to the digital data stored in the data repository. In an example, the data repository comprises URL1, URL2, URL3, URL4, and URL5. In such an example, URL1 is crawled first, URL2 is crawled second, URL3 is crawled third, URL4 is crawled fourth, and URL5 is crawled fifth. In such an example, each uniform resource locator (URL) has additional web-content associated therewith. Moreover, the additional web-content associated with each uniform resource locator (URL) has an importance value higher than the predefined threshold value. In such an example, URL1 has importance value of 5, URL2 has importance value of 8, URL3 has importance value of 6, URL4 has importance value of 9, URL5 has importance value of 7, and the predefined threshold value is 4. The list of uniform resource locator (URL) is modified such that the URL having high importance value is crawled prior to the URL having low importance value. In such an example, URL4 is crawled first, URL2 is crawled second, URL5 is crawled third, URL3 is crawled fourth, and URL1 is crawled fifth. It will be appreciated that the list of uniform resource locator (URL) is changed based on the importance value.

It will be appreciated that data processing arrangement is configured to update the web-content stored in the data repository with the additional web-content upon determining the importance value to be greater than the predefined threshold value. Typically, updating the data repository refers to altering, creating or appending the data included in the records or files related to the web-content stored in the data repository based on whether the additional web-content which is to be updated in the data repository is significant in context to the web-content displayed on the website. In other words, if the importance value of the additional web-content is greater than predefined threshold value the data repository is updated. For example, the updating of a data repository including a web-content related to a subject matter (such as disease) may comprise adding, removing, and modifying the data stored in the table, map, grid, packet, datagram, and the like, of the data repository storing the web-content related to a subject matter.

In an example, a data repository comprising web-content about top hundred companies may have content such as name of the company, founder of the company, chief officers of the company, location of headquarters of the company, net worth of the company, countries in which the company is functional, number of patents filed by the company, number of employees and the like. The data repository is accessed by individuals and organizations to recognize the top-hundred companies having influence on people. In such an example, the web-content is subjected to regular changes which are essential for the data repository. In such an example, additional web-content is updated based on whether the additional web-content is significant in context to the web-content about the top hundred companies. In other words, the additional web-content is updated to the data repository if the importance value of the additional web-content is greater than predefined threshold value.

In another example, a data repository comprises web-content about drugs involved in curing various diseases such as: name of the drug, name of the disease, chemical structure of the drug, name of the drug manufacturer, disease affected regions, origin of the disease, history of drugs used for treating the disease, and the like. The data repository is accessed by individuals and organizations to recognize the diseases affecting people and the corresponding drug to treat the diseases. In such an example, the web-content is subject to regular changes which are essential for updating the data repository. In such an example, additional web-content is updated based on whether the additional web-content is significant in context to the web-content about the drugs involved in curing various diseases. Therefore, the data repository is kept updated with new diseases as well as new drugs for previously known diseases.

In yet another example, a data repository comprises web-content about various companies and their performance in stock market such as: name of the company, stock price of the company, year of introduction in the stock market, and the like. The data repository is accessed by individuals and organizations to recognize the developments of the companies in the stock market. In such an example, the web-content is subject to regular changes which are essential for updating the data repository. In such an example, additional web-content is updated based on whether the additional web-content is significant in context to the web-content about various companies and their performance in stock market. Therefore, the data repository is kept updated with latest stock information of the company.

In another example, a data repository comprises web-content about various music albums such as: name of the music album, name of the songs in the album, composer of the songs, singer of the songs and the like. The data repository is accessed by individuals and organizations to recognize the developments in music industry. In such an example, the web-content is subject to regular changes which are essential for updating the data repository. In such an example, additional web-content is updated based on whether the additional web-content is significant in context to the web-content about various music albums. Therefore, the data repository is kept updated with web-content related to music albums.

It will be appreciated that the data processing arrangement further comprises a forecast module to predict a time for crawling the web-content. The prediction of the time for crawling the web-content is based on a time series analysis of the changes in the web-content. Moreover, an output of the machine learning algorithm serves as a training data for the forecast module such that a timestamp is associated with each uniform resource locator (URL). Furthermore, the forecast module learns a frequency of change in web-content and their approximate timelines. Moreover, based on the learning, the forecast module predicts an approximate time for a next crawling activity of that uniform resource locator (URL). It will be appreciated that, based on the prediction of the forecast module the list of the uniform resource locator (URL) is modified. The present disclosure thereby enables a given user to predict the time for next update and modify the data processing arrangement accordingly. Moreover, the given user may optimize space of the data processing arrangement and cost based on the time of crawling. In an example, a given uniform resource locator (URL) undergoes first addition in web-content having importance score greater than predefined threshold value and second addition in web-content having importance score smaller than predefined threshold value. In such an example, the first addition takes place once in a week and the second addition takes place every day. In such an example, the forecast module predicts the time for crawling the web-content. Optionally, the forecast module employs a machine learning algorithm to predict a time for crawling web-content. More optionally, the machine learning algorithm used for predicting the time for crawling the web-content is same as the machine learning algorithm used for determining the importance value for the additional web-content.

Furthermore, the data processing arrangement include a set of routines and program codes that is configured to update the data repository by altering, creating or appending the data, records or files related to the web-content stored in the data repository with the additional web-content the corresponding the additional web-content having an importance value greater than the predefined threshold value. In an example, a web-content may be data displayed on the website of hospital. In such instance, the data may be describing the names of doctors treating various diseases, images of the hospital cafeteria, and the like. Furthermore, in such instance, an additional web content may be a change in name of a doctor displayed on the website of hospital. In yet another instance, an additional web content may be an image of the hospital cafeteria displayed on the website of hospital. In such instance, the importance value assigned to the additional web content describing the change in name of the doctors on the website of hospital, may be higher than the additional web content describing the image of the hospital cafeteria. In such instance the set of routines and program codes that is configured to update the data repository by altering the data may be describing the names of doctors previously stored with the changes name of the doctors.

Optionally, the machine learning algorithm can learn by example from a given importance value that manually defines where the one or more change in the web content are to be updated onto the web-content stored in the data repository with the additional web-content, neural networks and variable state engines of the artificial intelligence (AI) algorithms are thereby programmed to perform such defining of where the web-content stored in the data repository with the additional web-content. Thus, it will be appreciated that updating of the repository to the present disclosure can be generated in a semi-automated or automated manner.

The present disclosure also relates to the method as described above. Various embodiments and variants disclosed above apply mutatis mutandis to the method.

Optionally, in the method, the importance value is validated using the feedback received from the user.

Optionally, in the method, the machine learning algorithm uses historical recorded data as input parameter for determining the importance value for the additional web-content.

Optionally, in the method, the data processing arrangement comprises a forecast module to predict a time for crawling web-content.

Optionally, in the method, the prediction is based on at least one of:
the importance value of the additional web-content; and
the feedback provided by the user for validating the importance value of the additional web-content.

Optionally, in the method, the set of predefined parameters comprises at least one of: the type of addition in the web-content, the position of the addition in the web-content, the quality of addition in the web-content, and the quantity of addition in the web-content.

Optionally, in the method, the plurality of data related to the web-content comprises the time stamp, the source of the web-content, count of additions made in the web-content, and the word count of the web-content.

DETAILED DESCRIPTION OF THE DRAWINGS

Figure 1:
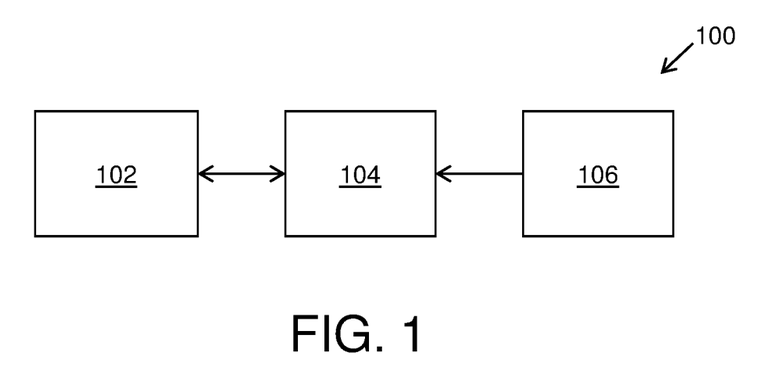
FIG. 1 is a block diagram of a system for crawling web-content, in accordance with an embodiment of the present disclosure.

Referring to FIG. 1 illustrated is a block diagram of a system 100 for crawling web-content, in accordance with an embodiment of the present disclosure. The system 100 comprises a data repository 102 storing web-content and a data processing arrangement 104 communicatively coupled to the data repository 102. Furthermore, the data processing arrangement 104 is coupled to a web-server 106 hosting a website (not shown) for displaying the web-content.

Figure 2:
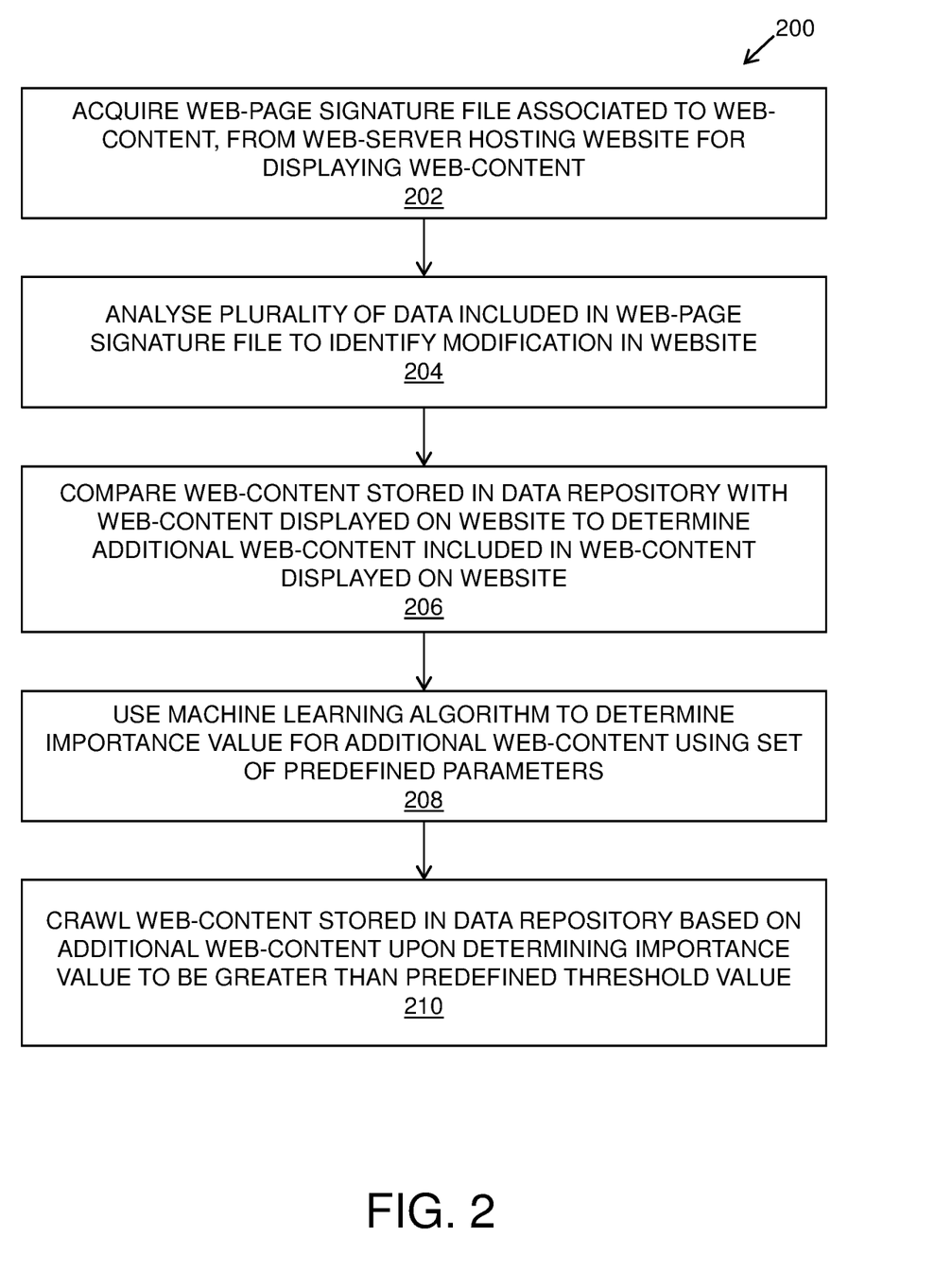
FIG. 2 is an illustration steps of a method for crawling web-content, in accordance with an embodiment of the present disclosure.

Referring to FIG. 2 illustrated are steps of a method 200 for crawling web-content, in accordance with an embodiment of the present disclosure. At a step 202, a web-page signature file associated to the web-content is acquired from a web-server hosting a website for displaying the web-content. The web-page signature file includes a plurality of data related to the web-content. At a step 204, the plurality of data included in the web-page signature file are analysed to identify a modification in the website. At a step 206, the web-content stored in the data repository is compared with the web-content displayed on the website to determine additional web-content included in the web-content displayed on the website. At a step 208, a machine learning algorithm is used to determine an importance value for the additional web-content using a set of predefined parameters. At a step 210, the web-content stored in the data repository is crawled based on the additional web-content upon determining the importance value to be greater than a predefined threshold value.

The steps 202 to 210 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system comprising:
   a data repository storing web-content;
   a data processing arrangement communicatively coupled to the data repository, wherein the data processing arrangement is configured to:
   acquire a web-page signature file associated to the web-content, from a web-server hosting a website for displaying the web-content, wherein the web-page signature file includes a plurality of data related to the web-content;
   analyse the plurality of data included in the web-page signature file to identify a modification in the website;
   compare the web-content stored in the data repository with the web-content displayed on the website to determine additional web-content included in the web-content displayed on the website;
   use a machine learning algorithm to determine an importance value for the additional web-content using a set of predefined parameters, wherein the importance value of the additional web content defines significance of the additional web-content in context of the web-content displayed on the website; and
   crawl the web-content stored in the data repository based on the additional web-content upon determining the importance value to be greater than a predefined threshold value.

2. The system of claim 1, wherein the importance value is validated using a feedback received from a user.

3. The system of claim 1, wherein the machine learning algorithm further uses historical recorded data as input parameter for determining the importance value for the additional web-content.

4. The system of claim 1, wherein the data processing arrangement comprises a forecast module to predict a time for crawling web-content.

5. The system of claim 1, wherein the prediction is based on at least one of:
   the importance value of the additional web-content; and
   the feedback provided by the user for validating the importance value of the additional web-content.

6. The system of claim 1, wherein the set of predefined parameters comprises at least one of: a type of addition in the web-content, a position of the addition in the web-content, a quality of addition in the web-content, and a quantity of addition in the web-content.

7. The system of claim 1, wherein the plurality of data related to the web-content comprises a time stamp, a source of the web-content, count of additions made in the web-content, and a word count of the web-content.

8. A method implemented via a system comprising:
   a data repository storing web-content;
   a data processing arrangement communicatively coupled to the data repository, wherein the method comprises:
   acquiring a web-page signature file associated to the web-content, from a web-server hosting a website for displaying the web-content, wherein the web-page signature file includes a plurality of data related to the web-content;
   analysing the plurality of data included in the web-page signature file to identify a modification in the website;
   comparing the web-content stored in the data repository with the web-content displayed on the website to determine additional web-content included in the web-content displayed on the website;
   using a machine learning algorithm to determine an importance value for the additional web-content using a set of predefined parameters, wherein the importance value of the additional web content defines significance of the additional web-content in context of the web-content displayed on the website; and
   crawling the web-content stored in the data repository based on the additional web-content upon determining the importance value to be greater than a predefined threshold value.

9. The method of claim 8, wherein the importance value is validated using a feedback received from a user.

10. The method of claim 8, wherein the machine learning algorithm uses historical recorded data as input parameter for determining the importance value for the additional web-content.

11. The method of claim 8, wherein the data processing arrangement comprises a forecast module to predict a time for crawling web-content.

12. The method of claim 8, wherein the prediction is based on at least one of:
    the importance value of the additional web-content; and
    the feedback provided by the user for validating the importance value of the additional web-content.

13. The method of claim 8, wherein the set of predefined parameters comprises at least one of: a type of addition in the web-content, a position of the addition in the web-content, a quality of addition in the web-content, and a quantity of addition in the web-content.

14. The method of claim 8, wherein the plurality of data related to the web-content comprises a time stamp, a source of the web-content, count of additions made in the web-content, and a word count of the web-content.

15. A computer readable medium, containing program instructions for execution on a computer system, which when executed by a computer, cause the computer to perform method steps, wherein the method is implemented via a system comprising:
    a data repository storing web-content;
    a data processing arrangement communicatively coupled to the data repository, wherein the method comprises:
    acquiring a web-page signature file associated to the web-content, from a web-server hosting a website for displaying the web-content, wherein the web-page signature file includes a plurality of data related to the web-content;

analysing the plurality of data included in the web-page signature file to identify a modification in the website;

comparing the web-content stored in the data repository with the web-content displayed on the website to determine additional web-content included in the web-content displayed on the website;

using a machine learning algorithm to determine an importance value for the additional web-content using a set of predefined parameters, wherein the importance value of the additional web content defines significance of the additional web-content in context of the web-content displayed on the website; and crawling the web-content stored in the data repository based on the additional web-content upon determining the importance value to be greater than a predefined threshold value.

\* \* \* \* \*